(12) United States Patent
Apostolopoulos

(10) Patent No.: US 7,966,488 B2
(45) Date of Patent: *Jun. 21, 2011

(54) METHODS AND SYSTEMS THAT USE INFORMATION ABOUT ENCRYPTED DATA PACKETS TO DETERMINE AN ORDER FOR SENDING THE DATA PACKETS

(75) Inventor: John G. Apostolopoulos, Palo Alto, CA (US)

(73) Assignee: Hewlett-Packard Development Company, L. P., Houston, TX (US)

( * ) Notice: Subject to any disclaimer, the term of this patent is extended or adjusted under 35 U.S.C. 154(b) by 1517 days.

This patent is subject to a terminal disclaimer.

(21) Appl. No.: 10/970,620

(22) Filed: Oct. 20, 2004

(65) Prior Publication Data

US 2005/0169175 A1 Aug. 4, 2005

Related U.S. Application Data

(63) Continuation-in-part of application No. 10/769,327, filed on Jan. 30, 2004.

(51) Int. Cl.
*H04L 29/60* (2006.01)
(52) U.S. Cl. ........................................ 713/160; 380/210
(58) Field of Classification Search .................. 370/338, 370/413, 473; 380/210; 709/203, 227, 238, 709/245, 250; 713/167, 193, 160; 726/12
See application file for complete search history.

(56) References Cited

U.S. PATENT DOCUMENTS

| | | | |
|---|---|---|---|
| 5,721,742 A | 2/1998 | Okajima et al. | |
| 6,058,479 A * | 5/2000 | Sørhaug et al. | 713/193 |
| 6,182,141 B1 * | 1/2001 | Blum et al. | 709/227 |
| 6,253,326 B1 * | 6/2001 | Lincke et al. | 726/12 |
| 6,445,717 B1 * | 9/2002 | Gibson et al. | 370/473 |
| 6,590,885 B1 * | 7/2003 | Jorgensen | 370/338 |
| 7,164,680 B2 | 1/2007 | Loguinov | |
| 2001/0023460 A1 * | 9/2001 | Boucher et al. | 709/250 |
| 2002/0138845 A1 * | 9/2002 | Hoang | 725/90 |
| 2002/0163911 A1 | 11/2002 | Wee et al. | |
| 2002/0164024 A1 * | 11/2002 | Arakawa et al. | 380/210 |
| 2002/0181506 A1 * | 12/2002 | Loguinov | 370/473 |
| 2003/0067903 A1 * | 4/2003 | Jorgensen | 370/338 |
| 2003/0120811 A1 * | 6/2003 | Hanson et al. | 709/245 |
| 2003/0135643 A1 * | 7/2003 | Chiu et al. | 709/238 |
| 2003/0233544 A1 * | 12/2003 | Erlingsson | 713/167 |

(Continued)

FOREIGN PATENT DOCUMENTS

DE 100141533 4/2003

(Continued)

OTHER PUBLICATIONS

Heng Wang, A Simple Packet Transmission Scheme for Wireless Data over Fading Channels, Mar. 2002, Conference on Information Sciences and Systems (CISS),pp. 1-25.*

F Dufaux et al—"JPSEC for Secure Imaging in JPEG 2000"—Proc SPIE Applications of Digital Image Processing XXVII—Aug. 2004.

*Primary Examiner* — Kambiz Zand
*Assistant Examiner* — Monjour Rahim

(57) ABSTRACT

Methods and systems thereof for streaming media data are described. Media data comprising a plurality of data packets is accessed. The media data includes encrypted data. Information that quantifies a characteristic of each data packet in the plurality of data packets is also accessed. That information is used to determine an order for sending the data packets over a network. The order is determined without decrypting the encrypted data.

45 Claims, 10 Drawing Sheets

U.S. PATENT DOCUMENTS

| | | | |
|---|---|---|---|
| 2004/0004972 A1* | 1/2004 | Lakshmanamurthy et al. | 370/413 |
| 2004/0030745 A1* | 2/2004 | Boucher et al. | 709/203 |
| 2005/0108746 A1* | 5/2005 | Futagami et al. | 725/31 |
| 2005/0147103 A1* | 7/2005 | Yang et al. | 370/395.4 |
| 2005/0169312 A1 | 8/2005 | Cakareski et al. | |

FOREIGN PATENT DOCUMENTS

| | | | | |
|---|---|---|---|---|
| EP | 1320973 | 6/2003 | | |
| EP | 1465426 | 10/2004 | | |
| WO | 02098102 | 12/2002 | | |
| WO | WO02098102 | * 12/2002 | | 725/125 |

* cited by examiner

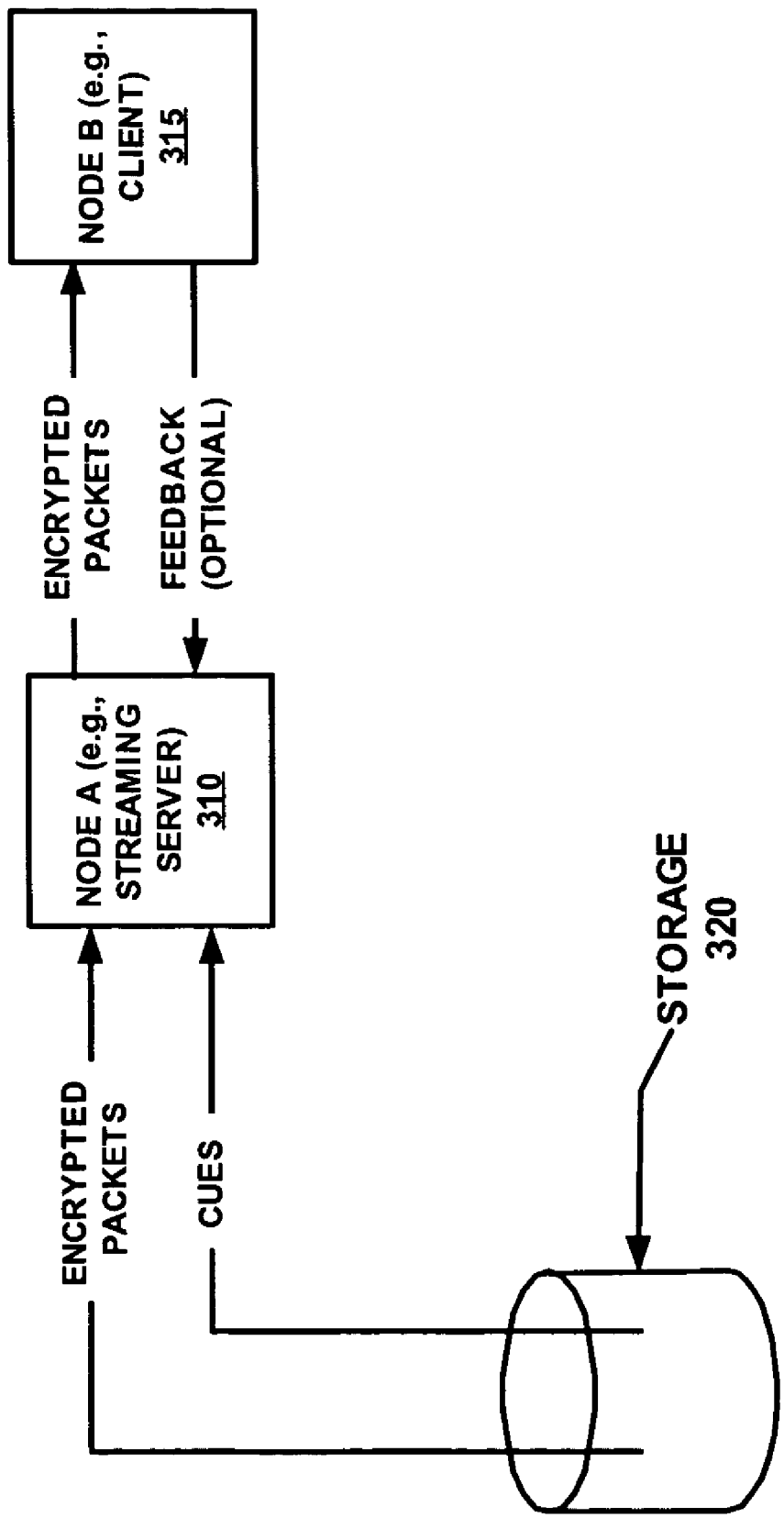

METHODS AND SYSTEMS THAT USE INFORMATION ABOUT ENCRYPTED DATA PACKETS TO DETERMINE AN ORDER FOR SENDING THE DATA PACKETS

CROSS REFERENCE TO RELATED APPLICATION

This application is a Continuation-in-Part of the co-pending, commonly-owned U.S. patent application, Ser. No. 10/1769,327, filed Jan. 30, 2004, by J. G. Apostolopoulos et al., and entitled "Methods and Systems that Use Information About Data Packets to Determine an Order for Sending the Data Packets," and hereby incorporated by reference in its entirety.

TECHNICAL FIELD

Embodiments of the present invention relate to the field of streaming media data.

BACKGROUND ART

Streaming media systems transmit media data, such as video and audio data, in data packets over wired and/or wireless networks. Due to constraints on available bandwidth, for example, some data packets transmitted over a network can experience delays along the way, perhaps arriving late at a destination node. Also, some data packets may be lost along the way.

The effects of late or lost data packets may be exacerbated for video data that are predictively encoded (compressed). Predictive encoding introduces dependencies in the encoded data that improve the amount of compression but can also result in error propagation in the event of data packet loss or late arrival.

Video frames are preferably received before their display (playback) times. With predictive encoding, the decoding of a frame of data may rely on the information in another frame, and therefore some frames need to be received earlier than their display time so that they can be used to decode other frames. For example, with MPEG (Moving Pictures Experts Group) encoding, a P-frame is predicted from a preceding P-frame or I-frame, and a B-frame is predicted from two P-frames or an I-frame and P-frame.

Encoded video frames that do not arrive or that arrive late at the decoder (e.g., a client or destination node) will not only miss their respective display deadlines, but they may also prevent a number of other, subsequent frames from being displayed properly. Thus, a number of frames may be prevented from being properly decoded and displayed due to a single late or missing frame, depending on the particular coding dependencies of the late or missing frame. This can affect the overall quality of the display.

Video transcoding offers one solution that allows encoded data to be adapted to accommodate available bandwidth and packet losses. A transcoder takes a compressed, or encoded, data stream as an input, and then processes it to produce another encoded data stream as an output. Examples of transcoding operations include bit rate reduction, rate shaping, spatial downsampling, and frame rate reduction. Transcoding can improve system scalability and efficiency, for example, by adapting the spatial resolution of an image to a particular client's display capabilities or by dynamically adjusting the bit rate of a data stream to match a network channel's time-varying characteristics.

While network transcoding facilitates scalability in data delivery systems, it also presents a number of challenges. The process of transcoding can place a substantial computational load on transcoding nodes. While computationally efficient transcoding algorithms have been developed, they may not be well-suited for processing hundreds or thousands of streams at intermediate network nodes.

Furthermore, transcoding poses a threat to the security of the delivery system because conventional transcoding operations require that an encrypted stream be decrypted before transcoding. The transcoded result is re-encrypted but is decrypted at the next transcoder. Each transcoder thus presents a possible breach in the security of the system. This is not an acceptable situation when end-to-end security is required.

Accordingly, a method and/or system that can allow scaling (e.g., transcoding) of data in a secure and computationally efficient manner would be advantageous. The present invention provides these as well as other advantages.

DISCLOSURE OF THE INVENTION

Embodiments of the present invention pertain to methods and systems thereof for streaming media data. Media data comprising a plurality of data packets is accessed. The media data includes encrypted data. Information that quantifies a characteristic of each data packet in the plurality of data packets is also accessed. That information is used to determine an order for sending the data packets over a network. The order is determined without decrypting the encrypted data.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 3 is a block diagram illustrating a streaming operation between network nodes according to one embodiment of the present invention.

Figure 1:
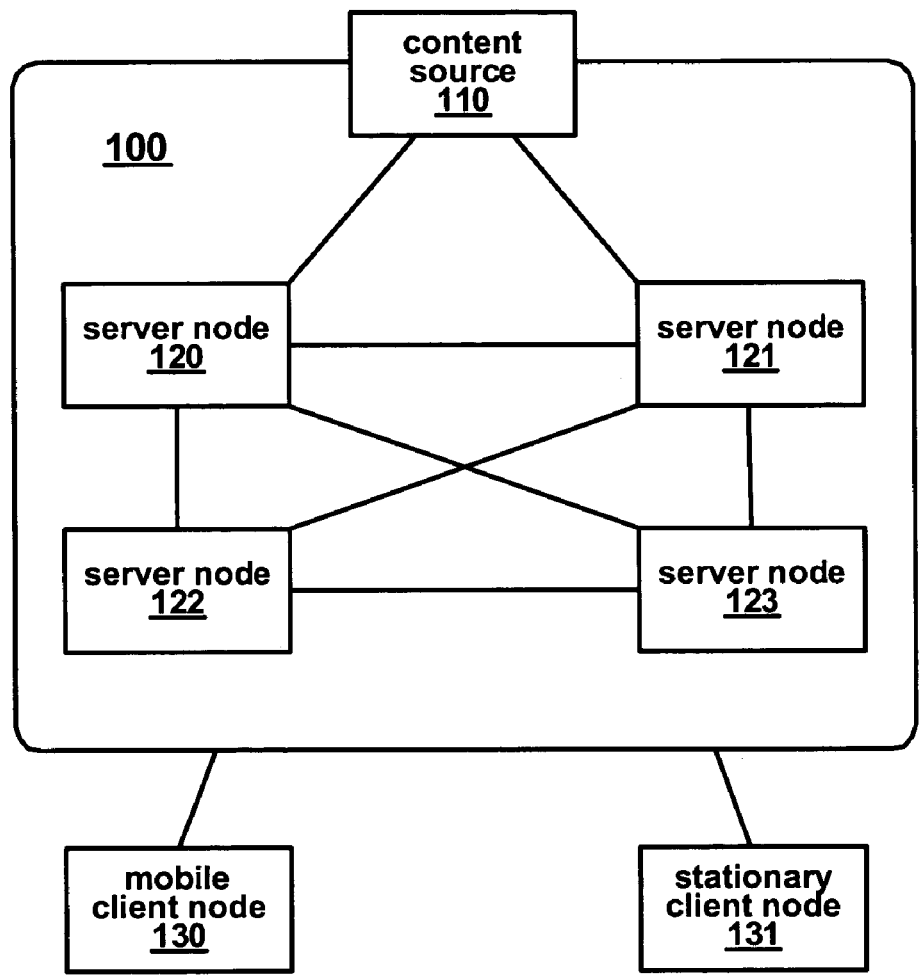
FIG. 1 is a representation of a network upon which embodiments of the present invention may be implemented.

The drawings referred to in this description should not be understood as being drawn to scale except if specifically noted.

BEST MODE FOR CARRYING OUT THE INVENTION

Reference will now be made in detail to various embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following description of the present invention, numerous specific details are set forth in order to provide a thorough understanding of the present invention. In other instances, well-known methods, procedures, components, and circuits have not been described in detail as not to unnecessarily obscure aspects of the present invention.

The descriptions and examples provided herein are discussed in the context of multimedia data (also referred to herein as media data or media content). One example of multimedia data is video data accompanied by audio data; for example, a movie with soundtrack. However, media data can be video only, audio only, or both video and audio. In general, the present invention, in its various embodiments, is well-suited for use with speech-based data, audio-based data, image-based data, Web page-based data, graphic data and the like, and combinations thereof. Also, the present invention, in its various embodiments, is well-suited for use with data that may or may not be encoded (compressed) or transcoded.

In particular, embodiments of the present invention are described for video data, and in particular video data that are encoded using a predictive encoding technique such as that used in MPEG-1/2/4 and H.261/2/3/4 encoding. Because of the prediction and temporal dependencies introduced by such encoding techniques, predictively encoded video data introduce additional challenges relative to other types of data. As will be seen, the various features of the present invention can be applied to other types of data, particularly media data not as challenging as predictively encoded video data.

Also, embodiments of the present invention are discussed in the context of distortion, in particular with regard to distortion occurring in the display of a video object; however, the present invention is not so limited. With regard to video data, an objective of media streaming is to reduce or minimize distortion. "Reducing distortion" and "minimizing distortion" can be equivalently stated as "increasing quality." For video data, quality can be expressed in terms other than distortion. For types of data other than video data, quality can be expressed using many different terms known in the art.

The media data are typically separated into blocks of data. As video data, the blocks are typically referred to as frames. The data are streamed through a network as data packets. A data packet can include data for one or more frames, or the data constituting a frame may require more than one data packet.

Embodiments of the present invention are also described for media data (e.g., video data) that are encrypted and packetized. The data packets are independently decryptable so that one or more packets can be discarded without affecting the ability to decrypt other data packets. Encryption techniques that may be used in accordance with the present invention include, but are not limited to, popular encryption primitives such as the Data Encryption Standard (DES), Triple-DES (3DES), and the Advanced Encryption Standard (AES). These encryption primitives can be applied using a number of block-cipher modes including electronic codebook (ECB), cipher block chaining (CBC), cipher-feedback (CFB), output feedback (OFB), and counter (CTR) modes.

In addition, authentication techniques for the data packets that may be used in accordance with the present invention include, but are not limited to, popular authentication techniques such as message authentication codes (MACs) and digital signatures (DSs). Popular MACs include hash-based MACs such as Hashed Message Authentication Code (HMAC) using the Secure Hash Algorithm-1 (SHA-1) hash, or cipher-based MACs such as AES in CBC mode. The data packets can be independently authenticated so that one or more packets can be discarded without affecting the ability to authenticate other packets. Alternatively, groups of packets can be independently authenticated, so that groups of packets can be discarded without affecting the ability to authenticate other groups of packets.

The above cryptographic techniques may be applied using symmetric key techniques or using public/private key techniques.

For simplicity, the following discussions refer to encrypted content; however, generally the content can involve encryption and authentication and may have additional security services applied. Additionally, sometimes it is desirable for the content to remain unencrypted but with other security services, such as authentication. Embodiments of the present invention are applicable in all of the above situations.

FIG. 1 is a representation of a network 100 upon which embodiments of the present invention may be implemented. In the present embodiment, network 100 includes a content source 110 coupled to a number of interconnected server nodes 120, 121, 122 and 123. There may of course be a greater or lesser number of content sources and server nodes than those illustrated.

The interconnections between these nodes, including content source 110, may be a wired connection, a wireless connection, or a combination thereof. Each interconnection includes one or more channels, so that multiple streaming sessions between nodes can take place in parallel.

Generally speaking, content source 110 and server nodes 120-123 are types of devices that provide the capability to process and store data, and to send and receive such data. Accordingly, server nodes 120-123 may be computer systems as well as other types of devices that may not be typically considered computer systems but have similar capabilities.

In communication with network 100 are client devices such as mobile client node 130 and stationary client node 131. In one embodiment, network 100 is for streaming media data to client nodes 130 and/or 131. There may be a greater or lesser number of client nodes than those illustrated. The client nodes 130 and 131 may be coupled to the network 100 via a wired connection, a wireless connection, or a combination thereof.

In general, network 100 provides the capability to provide data from content source 110, and/or from any of the intermediate server nodes 120-123, to the client nodes 130-131. The route, or path, taken by the data as it travels from the content source 110 to the client nodes 130-131 may pass through any number of intervening nodes and interconnections between those nodes.

Generally speaking, embodiments of the present invention pertain to the streaming of data packets from a sender to a receiver, in particular data packets that contain encrypted data ("encrypted data packets"). Any of the nodes in network 100 may be considered to be a sender, and similarly any of the nodes in network 100 may be considered to be a receiver. The sender and receiver nodes may be adjacent nodes, or they may be separated by intervening nodes.

Figure 2A:
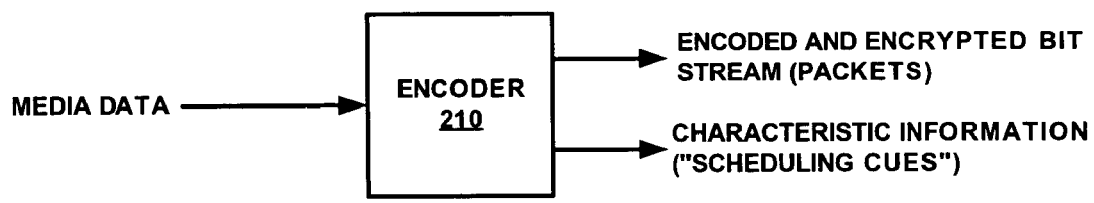
FIG. 2A is a block diagram illustrating the generation of cues for ordering data packets according to one embodiment of the present invention.

FIG. 2A is a block diagram illustrating an encoder 210 that generates cues that can be used to establish an order for sending data packets (in particular, encrypted data packets) according to one embodiment of the present invention. According to the present embodiment, when a media object (e.g., a video sequence) is encoded (compressed) and encrypted, an associated set of information is also created. The associated set of information is referred to herein as "scheduling cues."

The media data received by encoder 210 may or may not already be encrypted. If encrypted, the data are decrypted, encoded and re-encrypted. If not encrypted, the data are encoded and encrypted. Thus, encoder 210 can provide functionality (e.g., encrypting and/or decrypting functionality) in addition to encoding. Alternatively, the encrypting and/or decrypting functionality can be provided by another element in communication with encoder 210. Note that these encoding, encrypting and decrypting elements can exist as a single system (e.g., in software) on the same device, or on separate devices.

Thus, in the present embodiment, the output of encoder 210 is an encoded and encrypted bit stream embodied as data packets, and a set of scheduling cues that characterize each data packet in a quantifiable manner. The scheduling cues are used to schedule packet transmission, which will be described in further detail below.

In one embodiment, the scheduling cues are not encrypted, although the scheduling cues can be encrypted in applications where this additional security is advantageous. For example, the scheduling cues may be encrypted with a different encryption algorithm and different key than that used to encrypt the content. The scheduler can be given the key to decrypt the scheduling cues, without giving it the key for decrypting the content and thereby preserving the confidentiality of the content itself. This approach provides two layers of security: (1) security of the scheduling cues, and (2) security of the content itself. Alternatively, the scheduling cues may be encrypted while the content is not encrypted. This may be advantageous in applications involving the distribution of public content. While the content may not be proprietary, the scheduling cues used to facilitate transmission of the content may be proprietary, and hence it would be useful to encrypt the scheduling cues even though the content remains unencrypted.

In one embodiment, one or more scheduling cues are associated with each data packet. Alternatively, scheduling cues can be associated with each frame of video data. Also, the example of FIG. 2A shows scheduling cues being generated as data are encoded. Alternatively, scheduling cues can be generated for pre-encoded data or for data that are not encoded, as illustrated in FIG. 2B.

Figure 2B:
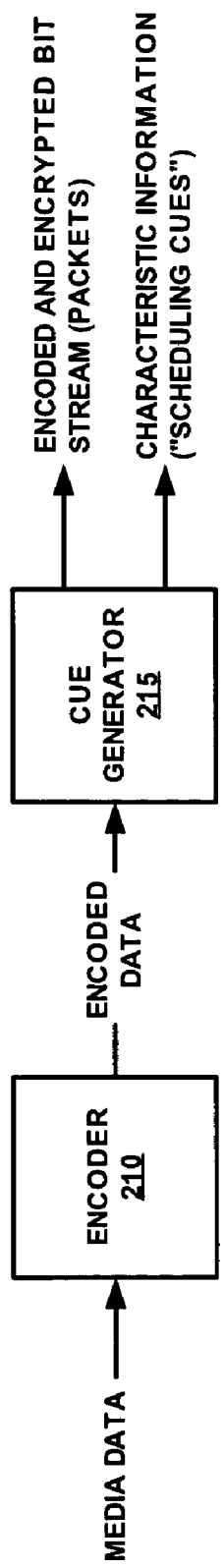
FIG. 2B is a block diagram illustrating the generation of cues for ordering data packets according to another embodiment of the present invention.

In FIG. 2B, encoder 210 encodes media data, and the encoded data are then sent to cue generator 215, which generates the scheduling cues for the pre-encoded data. Encoder 210 can encode the media data in entirety before sending the encoded data to cue generator 215. Alternatively, the encoded data can be streamed to cue generator 215 as the data are encoded. In addition, there may be a storage device or buffer situated between encoder 210 and cue generator 215. In the latter case, encoded data can be sent to the storage device after encoding or while it is being encoded. Cue generator 215 can then retrieve encoded data from the storage device as the data are needed.

As mentioned above, the media data (pre-encoded or otherwise) received by encoder 210 may or may not be encrypted. If encrypted, the data is decrypted at some point so that the scheduling cues can be generated, and then re-encrypted.

In one embodiment, the scheduling cues are stored in the same file as the media data (encoded or otherwise), and as such the scheduling cues can be referred to as a "track." However, the media data and the scheduling cues can be separately stored (as separate files or even in separate storage devices). In general, one or more scheduling cues are uniquely associated with a particular data packet or frame, and various mechanisms can be used to associate the scheduling cues with the appropriate data packet/frame or vice versa.

The scheduling cues can include a variety of information such as, but not limited to:

the nominal presentation (e.g., display) time for each packet;

the relative importance of each packet. For a video data packet, this can be measured in terms of the resulting distortion that would be produced in a display if that packet was lost, arrived late, or was not sent;

coding dependencies in media data (e.g., video data) that are predictively encoded; for example, what packets depend on other packets, what packets correspond to I-frames, P-frames or B-frames, or, for scalable coding, what packets form the base layer and what packets for each enhancement layer, and how many packets depend on any given packet;

which packets provide error-resilience (e.g., I-slices in compressed video) or redundancy (e.g., forward error correction packets that may be sent to help overcome losses);

packet information such as: information identifying the beginning and end of each data packet's data in the bit stream; Real-Time Protocol (RTP) header information for each data packet; whether a packet is the last data unit required to decode a media unit; etc.;

the length of each packet (e.g., in bytes); and/or the nominal transmission time of each packet, relative to the start of transmission (when the first data packet was transmitted). For example, the first packet is transmitted at time zero (0), the next packet at time 0+T, the next packet at time 0+2T, and so on. Nominal transmission times may be constant or uniform; however, generally the number of data packets transmitted per unit time varies as a function of the compressed bit rate for each unit of time.

In an application involving encoded video data, using the scheduling cues just described, one P-frame can be judged as being more important than another P-frame, by considering the amount of distortion that would result if data packets corresponding to the first P-frame were not sent versus the amount of distortion that would result if data packets for the second P-frame were not sent, or by considering the number of other frames that depend on the first P-frame versus the second P-frame, for example.

Thus, the scheduling cues provide a basis for making a reasoned decision about, for example, which data packets should be resent if for some reason they do not arrive at their destination, or which data packets can be skipped over (e.g., not sent) or delayed should it become necessary to resend other data packets. Importantly, using the scheduling cues, a streaming server can make such decisions without intensive computational effort, because much of the relevant information no longer needs to be computed in streaming time (as data are streamed). Also of importance is that the streaming server can make such decisions without decrypting the contents of the data packets. Moreover, the streaming server can make decisions without knowing the media type associated with the data packets. For example, the streaming server may not know whether the contents are video data or audio data, etc.

FIG. 3 is a block diagram illustrating a streaming operation between network nodes according to one embodiment of the present invention. The example of FIG. 3 shows a first node (node A 310) and a second node (node B 315) communicating over a network such as network 100 of FIG. 1. As noted, there may be other nodes between node A 310 and node B 315.

In general, node A 310 of FIG. 3 is a device that sends encrypted media data to node B 315. Node B 315 can optionally provide feedback about network performance to node A 310. For example, node B 315 can inform node A 310 of the available bandwidth, the average data packet loss rate, and/or which data packets have been correctly received. Feedback can also include information such as, but not limited to, data packet delivery rates, the time needed to traverse the path to node B 315, delays associated with the path to node B 315, and data packet loss patterns (or data packet received patterns). Node A 310 can also receive feedback from other sources, for example, from network management or monitoring devices. Also, or alternatively, node A 310 may have a priori information about network performance based, for example, on earlier streaming sessions or assumptions about network performance.

In the example of FIG. 3, node A 310 is a streaming server and node B 315 is a client device. With reference also to FIGS. 2A and 2B, the output of encoder 210 (e.g., data packets constituting the encoded and encrypted media data as well as the scheduling cues) can be stored in a storage element such as storage 320, where it can be accessed by server 310. Storage 320 can be an element separate from server 310 or incorporated into server 310. In the latter case, the output of encoder 210 is provided to server 310, which can store the output of encoder 210 in whole or in part before streaming the data packets to client 315. Alternatively, server 310 can incorporate encoder 210 (e.g., server 310 and encoder 210 are integrated within a single device).

In general, the encoding/encrypting and streaming operations can overlap or they can occur in series, separated by any amount of time. The encoding/encrypting and streaming operations can be performed by a single device or by multiple devices. The output of the encoding and encrypting operations can be stored in whole or in part by the encoding/encrypting device, by the streaming device, or by a storage element separate from those devices.

In the example of FIG. 3, client 315 requests a particular media object (e.g., a video object) from server 310. Server 310 receives the corresponding compressed and encrypted bit stream along with the scheduling cues from storage 320. Server 310 uses the scheduling cues to determine the "best" schedule for sending the encrypted data packets constituting the compressed bit stream, as described further below (refer to the discussion of FIGS. 5 and 6). The network performance information presented above can also be used when determining the transmission schedule. Server 310 can then send the data packets to the client 315 according to the transmission schedule, without decrypting the data packets. As will be seen, the schedule can be revised as frequently as needed or wanted. For video data, for example, more frequent updates can improve the quality of the display at client 315; however, more frequent updates increase the computational load placed on server 310.

Embodiments in accordance with the present invention are well-suited to a variety of different operational scenarios. Within the context of determining a transmission schedule, server 310 can decide which packet to send at the next transmission opportunity, which packets to send at the next multiple transmission opportunities, which packets to discard or not send, and which packets to resend. Server 310 can also decide whether or not to allocate forward error correction (FEC) information among the data packets, and if so, how to allocate the FEC protection across the data packets in order to maximize the expected quality, and how to distribute the FEC information among the data packets (e.g., the FEC information can be distributed among the packets, or certain data packets may be dedicated to carrying the FEC information). As mentioned previously herein, server 310 can make these decisions without decrypting the data in the data packets.

Also, the server 310 can decide whether to switch from the current compressed and encrypted bit stream to another compressed and encrypted bit stream that is better suited to the current network performance (e.g., available bandwidth or required error resilience). For example, because of the variety in client devices and the differences in their capabilities (e.g., different memory sizes, screen sizes, processor speeds, etc.), a media object can be encoded in different ways (e.g., different bit rates, different resolutions, etc.). For a given client, a bit stream for a requested media object may be selected according to that client's attributes. However, based on network performance characteristics, server 310 can decide whether to switch to another bit stream for the requested media object. Again, this decision can be made without decrypting either bit stream.

As mentioned above, server 310 may or may not receive feedback from the client or from other network devices. The feedback can take the form of acknowledgement messages (ACKs) and negative acknowledgement messages (NACKs) on a packet-by-packet basis, or it may be in the form of statistical properties, perhaps specified for a particular window of time (e.g., a 5% packet loss rate over the last 10 seconds). Bandwidth may be measured in terms of the number of packets transmitted, or in terms of the number of bytes transmitted. Server 310 can also act when no feedback is available, or based on assumed or a priori knowledge of network performance.

Figure 4:
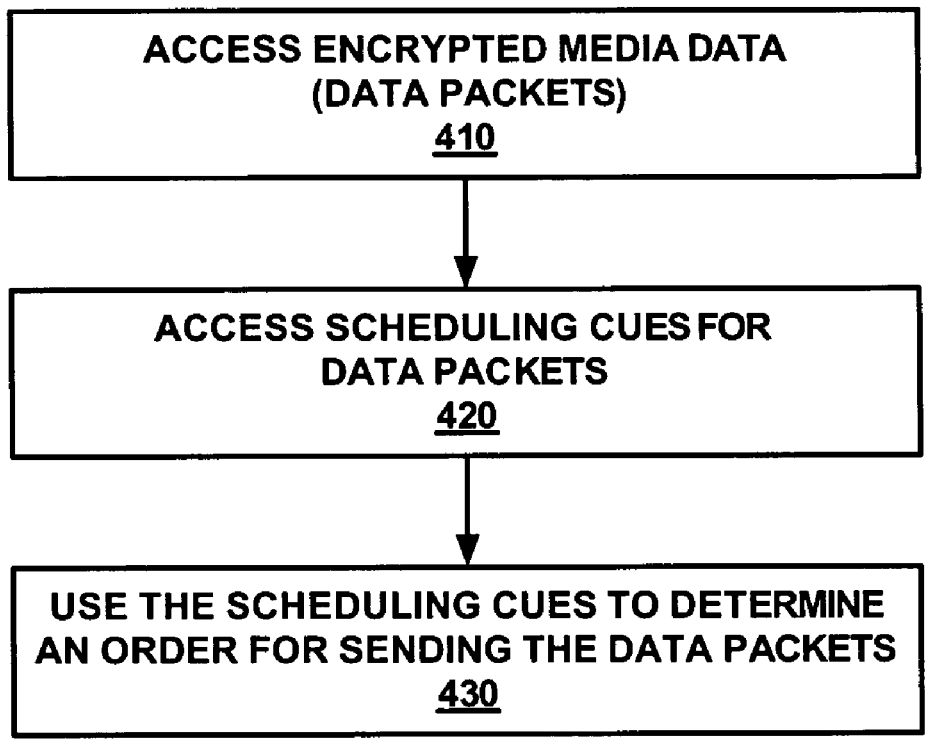
FIG. 4 is a flowchart of a method for streaming media data according to one embodiment of the present invention.
Figure 5:
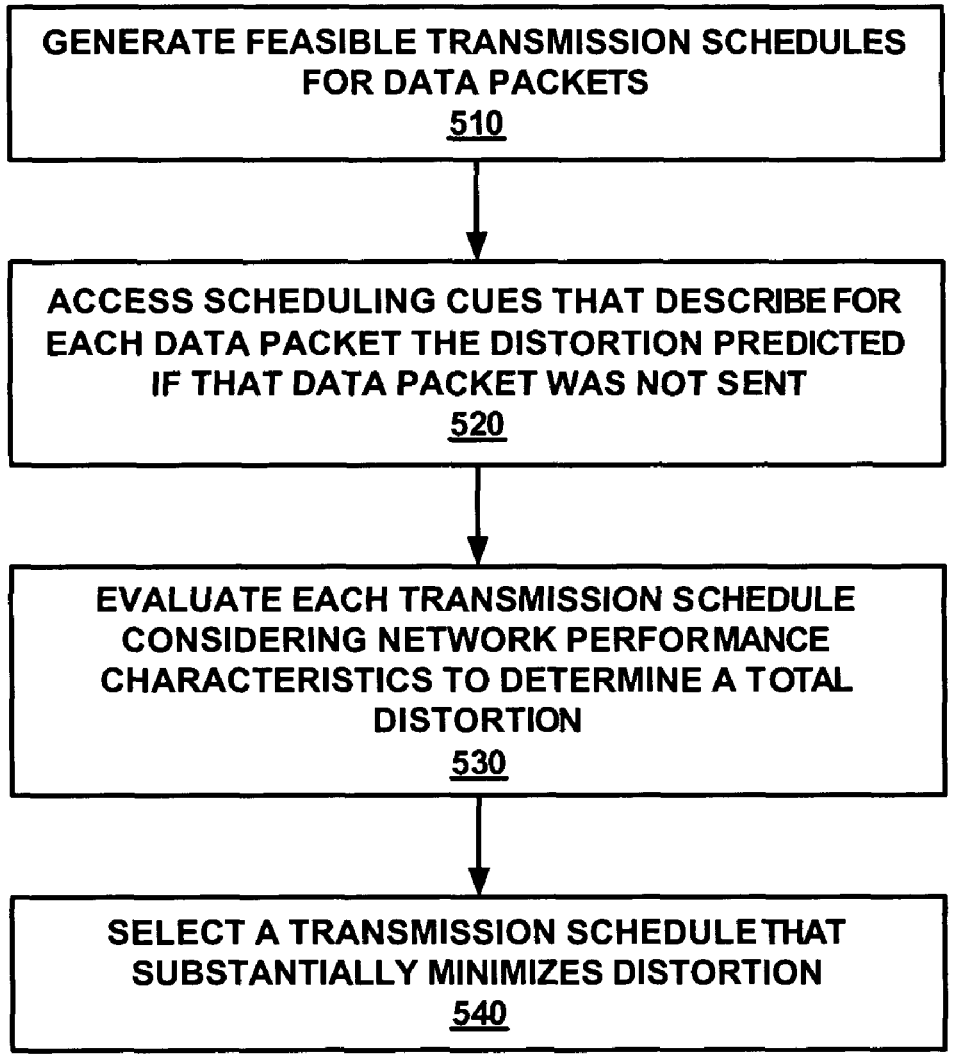
FIG. 5 is a flowchart of a method for scheduling the transmission of data packets according to one embodiment of the present invention.

FIG. 4 is a flowchart 400 of a method for streaming media data according to one embodiment of the present invention. FIG. 5 is a flowchart 500 of a method for scheduling the transmission of data packets according to one embodiment of the present invention. Although specific steps are disclosed in flowcharts 400 and 500, such steps are exemplary. That is, embodiments of the present invention are well-suited to performing various other steps or variations of the steps recited in flowcharts 400 and 500. It is appreciated that the steps in flowcharts 400 and 500 may be performed in an order different than presented, and that not all of the steps in flowcharts 400 and 500 may be performed. All of, or a portion of, the methods described by flowcharts 400 and 500 may be implemented using computer-readable and computer-executable instructions which reside, for example, in computer-usable media of a computer system. Generally, flowcharts 400 and 500 are implemented by server 310 of FIG. 3. Alternatively, the flowcharts may be implemented by node B 315 of FIG. 3, or by a mid-network monitoring node, edge server or proxy, with the selected transmission schedule sent to server 310 for streaming.

Referring first to FIG. 4, in step 410, media data embodied as a plurality of data packets is accessed. In one embodiment, the media data are encrypted.

In step 420, scheduling cues ("first information") that quantifies some characteristic of each data packet in the plurality of data packets is also accessed. The scheduling cues include, but are not limited to, information identifying the beginning and end of each data packet's data; header information for each data packet; information identifying the length of each data packet; information identifying a transmission time of each data packet; information identifying nominal presentation time for each data packet; information quantifying for each data packet an amount of distortion predicted to occur should that data packet not be sent or received; coding dependencies between the data packets; information identifying for each data packet how many data packets are dependent on that data packet; information identifying which data packets provide error resiliency; information identifying which data packets provide redundancy; and information identifying a deadline for delivering each data packet.

The scheduling cues may or may not be encrypted. If encrypted, the scheduling cues can be decrypted without decrypting the media data, thus maintaining the integrity and security of the media data. The scheduling cues can then be re-encrypted if desired.

In step 430, the scheduling cues are used to determine an order for sending the data packets over a network, without decrypting the data packets. In one embodiment, network performance characteristics ("second information") are also used to determine the order for sending data packets. Network performance characteristics include, but are not limited to, bandwidth available along a path in the network; bottleneck link capacity along the path; data packet delivery rate; data packet loss rate (also loss histograms); data packet received pattern; data packet loss pattern (also loss histograms); information identifying which of the data packets were received at a node along the path; information identifying which of the data packets did not arrive at a node along the path; information quantifying time needed to traverse the path; and information quantifying delays associated with the path. In another embodiment, a delivery deadline is identified for each packet, and this information is also used to determine the order for sending data packets.

The scheduling cues can be used to determine whether or not to send a particular data packet. The scheduling cues can also be used to determine whether to resend a particular data packet (e.g., a relatively important data packet did not arrive at its destination). Importantly, because encrypted data packets are not decrypted, embodiments in accordance with the present invention provide end-to-end security of the media data while also enabling transcoding or adaptive streaming to be performed.

Flowchart 500 of FIG. 5 provides a more detailed view of a method for determining a schedule for transmitting data packets according to one embodiment of the present invention, and is discussed with reference also to FIG. 6. In one embodiment, data in the data packets is encrypted.

In step 510, feasible transmission schedules 615 are generated using the list of data packets 618 to be scheduled as well as information that describes the current state and constraints 610 of the delivery process. The current state and constraints information 610 can include network performance characteristics such as those mentioned above (e.g., bandwidth, packet loss rate, delays, etc.). The current state and constraints information 610 can also include information such as delivery deadlines associated with each of the data packets being scheduled.

The list of data packets 618 can include any data packets not yet transmitted, any data packets transmitted but known to be lost during transmission, and any data packets transmitted but whose status is unknown. The list of data packets 618 to be scheduled may include all data packets associated with a media object, or they may include only a subset of all those data packets. In the latter instance, the delivery of each subset of data packets can be scheduled in turn. In either instance, the transmission schedule can be revised at a later time. In general, the data packets of primary interest are data packets that have been recently lost, data packets recently transmitted but their status is unknown (e.g., it is not known whether or not they were correctly delivered), and data packets yet to be delivered but need to be delivered in the relatively near future (e.g., as measured against their delivery deadline).

In step 520, scheduling cues 624 are accessed. The scheduling cues 624 may or may not be encrypted, as mentioned above. In one embodiment, the scheduling cues 624 quantify, for each data packet, an effect that would result if that data packet was not sent or received. For a video data packet, the amount of distortion expected to occur if that data packet was not sent or received can be specified by the scheduling cues 624.

The distortion associated with each data packet can be a measured distortion or an estimated distortion. In one embodiment, the measured distortion associated with losing a particular data packet is computed by, in essence, dropping that data packet from the bit stream and computing the resulting distortion produced when decoding the remaining data packets. This measurement can be performed as the media data are encoded (e.g., by encoder 210 of FIGS. 2A and 2B), before the data are encrypted. For pre-encoded but not yet encrypted data, the data packet can be dropped from the encoded (compressed) bit stream, the remainder of the packets can be decoded, and the resulting distortion can be computed; if the pre-encoded data are encrypted, the data can be decrypted prior to computing the distortion. The data is re-encrypted before being sent to an intermediate, possibly untrusted, network node.

In one embodiment, estimated distortion is accomplished by extracting information from the encoded bit stream that provides an indication of the distortion that may result. For example, for video data that has large motion vectors, a lost data packet will likely lead to much larger distortion than video data that has small or zero-value motion vectors. Measured distortion is more accurate than estimated distortion; however, measured distortion is more complex to compute.

For each sequence of data packets in a bit stream (e.g., for each list of data packets 618), a table can be generated that includes information (e.g., scheduling cues 624) about the data packets in the sequence. For each sequence, there may be more than one of such tables. For example, the distortion that results from the loss of a single data packet can be included in one of the tables. For N data packets, the table would be of size N×1, where an entry j in the table describes the distortion that would result if packet j is lost.

Another table can include the distortion that results for the loss of any two data packets. For N packets, the table would be of size N×N, where an entry (j,k) describes the distortion that result if packets j and k are both lost (packets j and k do not have to be consecutive packets in the sequence). Tables can be similarly derived for the loss of more than two packets. In general, for N packets, these tables would be of size $N^M$, where M is the number of data packets assumed to be lost.

However, smaller and less complex tables can be used while achieving similar performance. If two lost packets are sufficiently far apart from each other in the bit stream, then they will have an independent effect on the distortion. Therefore, the tables do not need to include information for combinations of lost packets that have an independent effect on distortion. For example, if all N video frames are encoded as I-frames, then they can be treated as independently effecting distortion, and a table of size N×1 would be generally sufficient. Also, the loss of a B-frame will not afflict other frames, and so a table of size N×1 is sufficient for B-frames.

Also, if video data are encoded with periodic I-frames (e.g., every 15th frame is an I-frame), then each group of pictures (GOP) can be treated separately. For example, consider a video having a length of N frames, and for simplicity of discussion, assume that each frame is encoded into a single data packet. For a GOP of 15 frames (data packets), for example, the video would be composed of N/15 GOPs. Each GOP can have its own table of distortion information. For the case in which two data packets are assumed lost, each GOP table would be of size 15×15. Thus, there would be N/15 tables, each of size 15×15, for a total size of N×15. Without exploiting the independence of each GOP, a table of size N×N would be needed for the case in which two packets are assumed to be lost.

If a video is encoded with partial intra-coding of each frame, as opposed to periodic I-frames, losses spaced sufficiently far apart in time can also be approximated as independent losses.

Also, consider an example in which the video includes a GOP of 15 frames that is independent of a following GOP. The GOP may have frames, in the following order: I1, B2, B3, B4, P5, B6, B7, B8, P9, B10, B11, B12, P13, B14, B15. In this example, all 15 frames depend on the first I-frame (I1), 14 frames depend on P5, 10 frames depend on frame P9, six frames depend on frame P13, and only one frame depends on each B-frame. The distortion tables for the example GOP may include a 15×1 table for all frames; a 15×1 table for all frames and larger dimension tables for the I-frames and P-frames (e.g., tables assuming a loss of two packets, three packets, and so on); or an 11×1 table for the eleven B-frames, with larger dimension tables for the I-frames and P-frames.

The sizes of tables can also be reduced by including information in the tables for only a subset of the data packets instead of for every packet. For example, the tables may include only sub-sampled information (e.g., information for every tenth packet) or information only for relatively important packets (e.g., those related to I-frames or P-frames). Alternatively, the tables may include only information carefully selected based on the relative importance of each packet (e.g., the packets that if lost result in the largest distortion, or that have pronounced rate-distortion tradeoffs that can be exploited).

While the above discussion has focused on MPEG video encoding with the popular I, P and B frame encoding modes, embodiments of the present invention also apply to other forms of encoding such as scalable encoding where once again the compressed data consist of different subsets of data with different priorities, coding dependencies and associated distortions.

Figure 6:
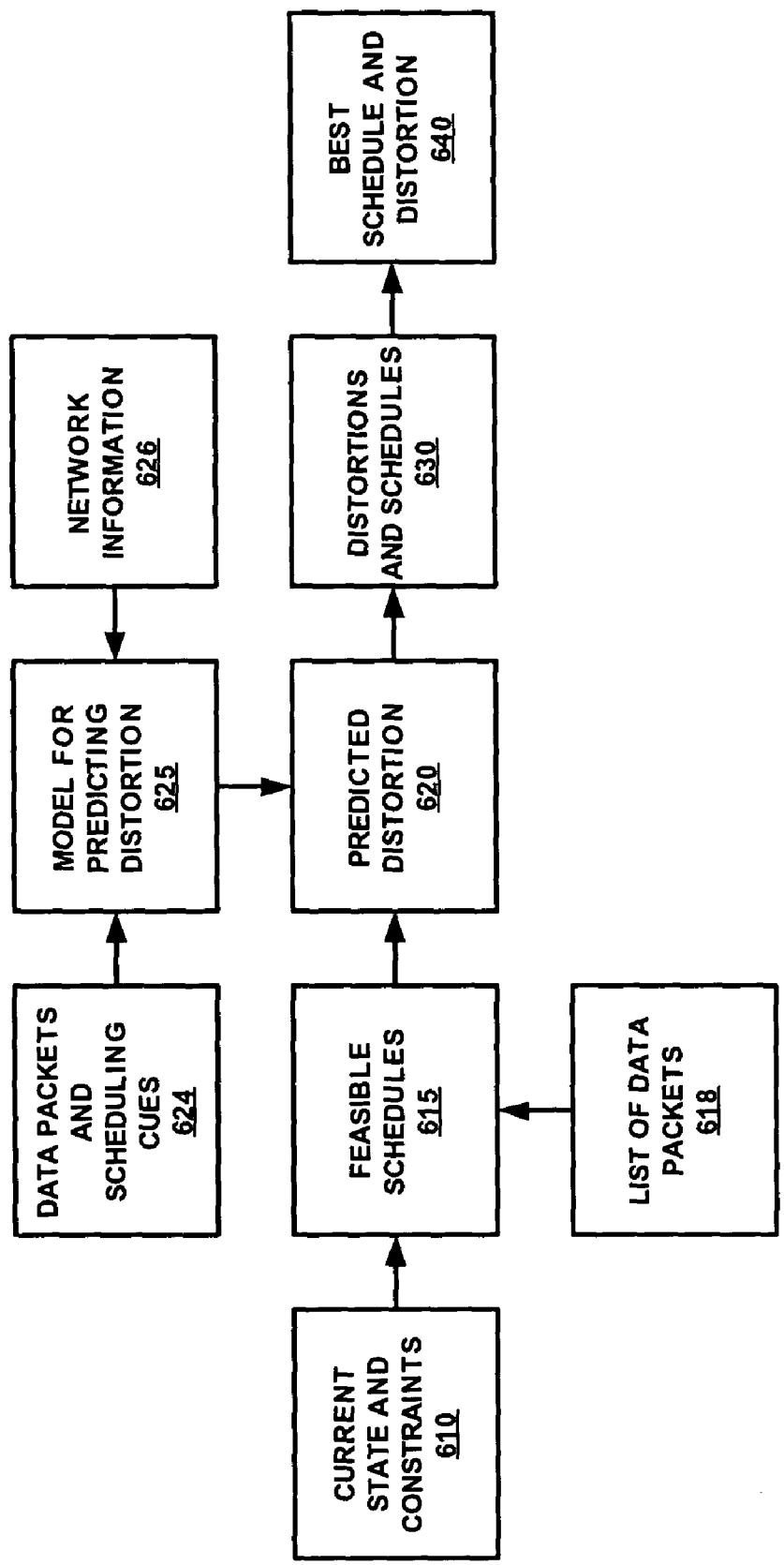
FIG. 6 is a flow diagram of a process for scheduling the transmission of data packets according to one embodiment of the present invention.

Continuing with reference to FIGS. 5 and 6, in step 530, using the encoded and encrypted bit stream along with the scheduling cue(s) 624, and also using information 626 that characterizes network performance along the delivery path, each of the transmission schedules is evaluated using a model 625 to predict the effect of each of the transmission schedules on a selected, quantifiable parameter. In one embodiment, model 625 predicts the distortion 620 for each schedule. For example, the distortion assuming loss of a single data packet from the plurality of data packets can be determined. Alternatively, the distortion assuming loss of data packets in different numbers and combinations can be determined. In one embodiment, the predicted distortions for each of the feasible schedules can be stored (630).

Note that the predicted distortion 620 can be a single number corresponding to the expected distortion, or it may be a distribution of expected distortions, or something in between (e.g., expected distortions with a tolerance band corresponding to, for example, one standard deviation). Alternatively, some form of cumulative distribution function for the distortion can be determined.

Note also that the predicted distortion 620, once determined, can then be used without decrypting the media data in the data packets.

In step 540, a transmission schedule that minimizes (or nearly minimizes) the total effect (e.g., distortion) is selected (the best schedule 640). Alternatively, a schedule that satisfies a specified threshold can be selected. For example, an acceptable level of distortion can be specified, and a schedule that does not exceed that level can be selected.

The encrypted data packets, or some portion thereof, can then be transmitted according to the selected schedule. The steps above can be repeated to determine a newer or updated schedule, even as the data packets are being sent under the existing schedule. For example, a new schedule can be determined for each data packet, for every group of N packets, for every video group of pictures, or every N seconds. A new schedule can also be determined in response to some sort of triggering event. For example, feedback from the client device (or any other downstream node) might indicate that a particular data packet did not arrive.

A new schedule can be determined when such feedback is received (the new schedule may include resending the data packet). Also, updated network performance characteristics may be received, and a new schedule accounting for any change in network performance can be determined as a result of receiving such information. A new schedule can also be determined if, for example, a particular data packet is, for some reason, not sent early enough for it to be received by its delivery deadline (in this case, the new schedule may choose not to send that data packet since, if it was sent, it would arrive late). As another example, if the updated network performance characteristics indicate that the available bandwidth has decreased, a new schedule can be created which attempts to minimize the expected distortion subject to the bandwidth constraint (the new schedule may include transmitting a smaller number of packets to meet the bandwidth constraint, where the particular selection of packets is chosen to minimize the expected distortion). The new or update schedule is determined without decrypting the media data in the data packets.

The above discussion is illustrated by way of a simplified example in which five data packets are to be sent, numbered one through five. The distortion associated with losing packet 1 is D1, for packet 2 the distortion is D2, and so on. The distortions D1 through D5 are included in the scheduling cue 624 associated with packets 1 through 5, respectively. A simplified model 625 for predicting distortion can entail summing the distortions that result for each data packet that is lost. Thus, to estimate the distortion that would result for any pattern of received or lost data packets, the distortions for each of the lost packets is summed. For example, if data packets 3 and 5 are lost, then the predicted distortion would be D3 plus D5. The best schedule is the one that results in the smallest predicted distortion for the predicted pattern of packet losses (based on network performance characteristics).

Figure 7:
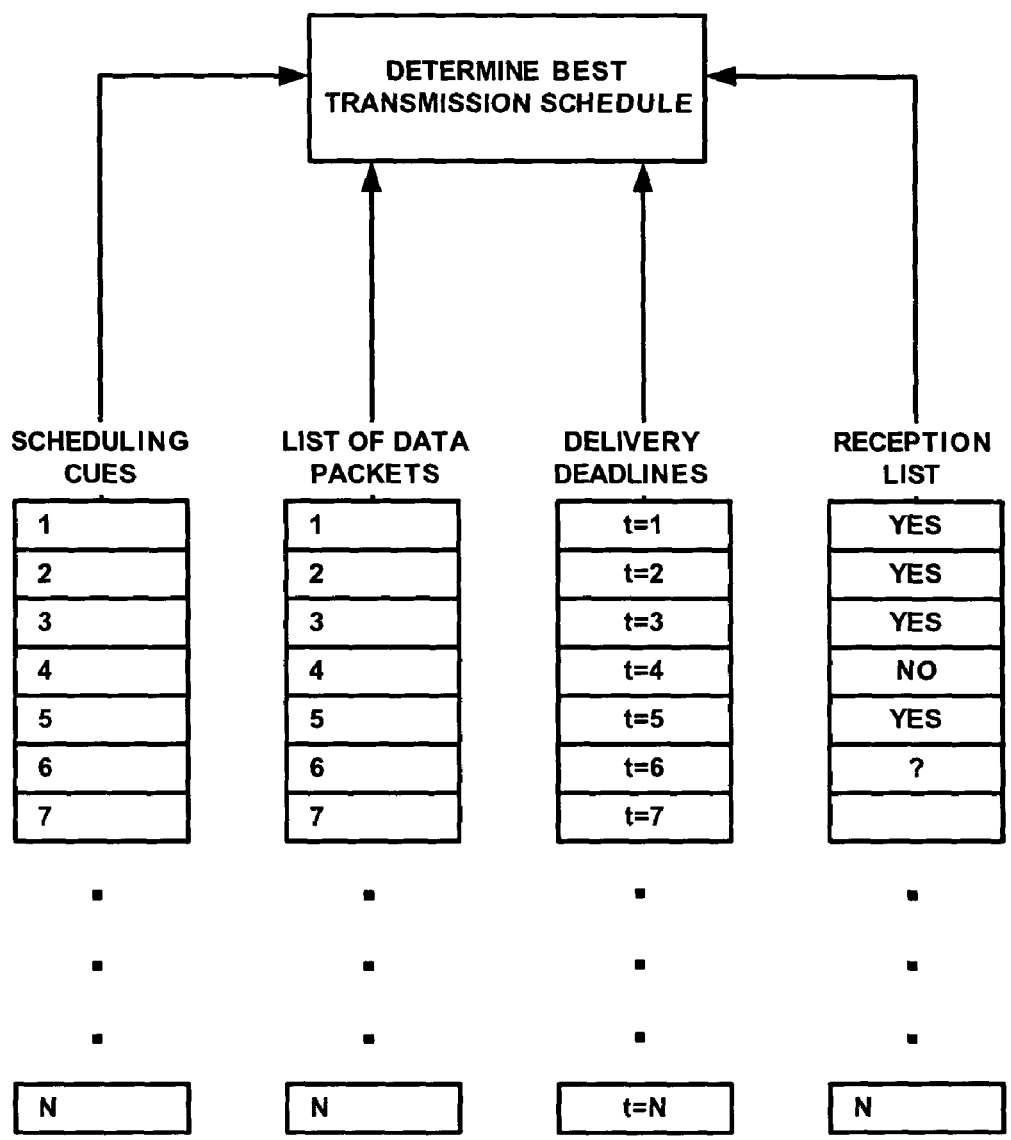
FIG. 7 illustrates an example of a process for scheduling the transmission of data packets according to one embodiment of the present invention.

FIG. 7 illustrates another example of a process for scheduling the transmission of data packets according to one embodiment of the present invention. The data packets are listed in a feasible transmission schedule. The feasible transmission schedule may be the best schedule determined in a preceding iteration.

Using the list of data packets, the associated delivery deadline for each data packet, the scheduling cues, and any information received about the reception, loss or late delivery of data packets, a transmission schedule can be determined for those packets remaining to be sent as well as any packets already sent but perhaps not correctly received.

In the example of FIG. 7, packets 1 through 6 have been previously transmitted, and processing to transmit packet 7 is next. Feedback information (e.g., from the client) indicates that packets 1, 2, 3 and 5 have been correctly received and packet 4 was not received. Packet 6 has been sent but no information is available as to whether or not it has been received. Based on this information, and also based on the scheduling cues, the streaming server (e.g., server 310 of FIG. 3) can, for example, decide whether to resend packet 4 or to send packet 7 at the next transmission opportunity. More importantly, the streaming server can make this decision without the use of complex algorithms that require substantial computational effort, without decrypting packet 7, and without knowing the contents of packet 7. For instance, to select between packet 4 and packet 7, the streaming server may simply select the packet having the greatest impact on distortion, based on the quantified distortion information provided by the scheduling cues. Thus, significant performance gains in packet scheduling can be achieved without invoking complex optimization techniques, without decrypting the data in the data packets, and without knowledge of the contents of the packets.

Figure 8:
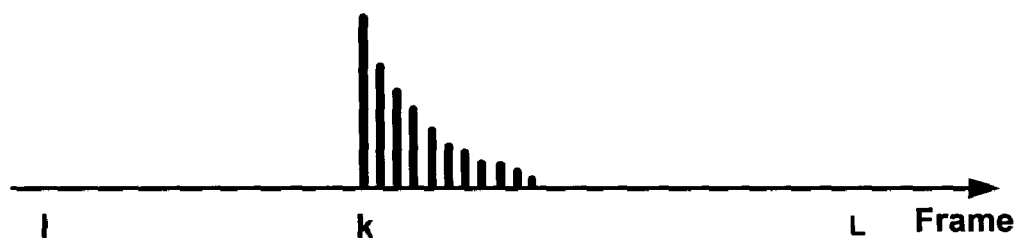
FIG. 8 is a graph showing distortion resulting from the loss of an isolated frame according to one embodiment of the present invention.

FIG. 8 is a graph showing distortion in mean-squared error (MSE) resulting from the loss of an isolated frame k according to one embodiment of the present invention. For a video sequence with L frames, there are L possible isolated losses, resulting in a linear storage cost of L numbers. FIG. 8 illustrates the distortion D(k) caused by losing frame k.

To model the distortion caused by an arbitrary loss pattern given only D(1) to D(L), a zero-th order distortion chain model, $DC^0$, can be employed, where zero-th order describes that no memory is assumed and that the distortion that results for each lost packet is independent of any prior lost packets. This model is accurate when losses are spaced far apart (e.g., when loss rate is low). When N frames $K=(k_1, k_2, \ldots, k_N)$ are lost, the predicted total distortion is simply given by:

$$\tilde{D}(K) = \sum_{i=1}^{N} D(k_i). \quad (1)$$

As mentioned earlier, the best transmission schedule for the packets of a video stream subject to a transmission bandwidth constraint is sought. This problem can be formalized as follows. Let W be a window of packets considered for transmission and let R* be the bandwidth constraint, measured either in bits or number of packets. A decision is sought on the subset of packets K∈W that should not be transmitted in order to satisfy the bandwidth constraint. Let R(W\K) be the rate associated with the packets from W that will be transmitted, where "\" denotes the operator "set difference." Thus, the subset K, such that the total distortion due to dropping K is minimized while meeting the bandwidth constraint is given, by:

$$K^* = \underset{K \in W: R(W \backslash K) \leq R^*}{\operatorname{argmin}} \tilde{D}(K). \quad (2)$$

Now, consider first solving equation (2) in the case when the transmission bandwidth R* is expressed as number of packets. Assume that R*=k, i.e., k packets are to be dropped from W. Then K* is found by sorting the distortions for each packet in increasing order, and selecting the first k packets (those with the K smallest associated distortions). In addition, if the problem changes to determine the best k+1 packets to drop, the solution then directly builds on the preceding solution. Specifically, the selection of the best subset of k packets to drop is contained in the best subset of k+1 packets to drop. In contrast, an approach that does not provide this property would have to perform a completely new search for every k. The optimal schedule can therefore be obtained with very little computation.

Next, consider the alternative case when R* is measured in bits. The integer programming required to obtain the exact optimal solution is difficult to compute. A practical approximation that can be employed is to drop packets that individually cause the least distortion per bit. Specifically, a packet je W is associated with a utility in terms of distortion per bit of λ=D(j)/R(j). K* is obtained by sorting the packets in W in decreasing λ, and then transmitting as many packets as possible starting from the highest utility (distortion-per-bit) packet. In this manner, once again an embedded search strategy is achieved with the associated low complexity benefits.

Figure 9:
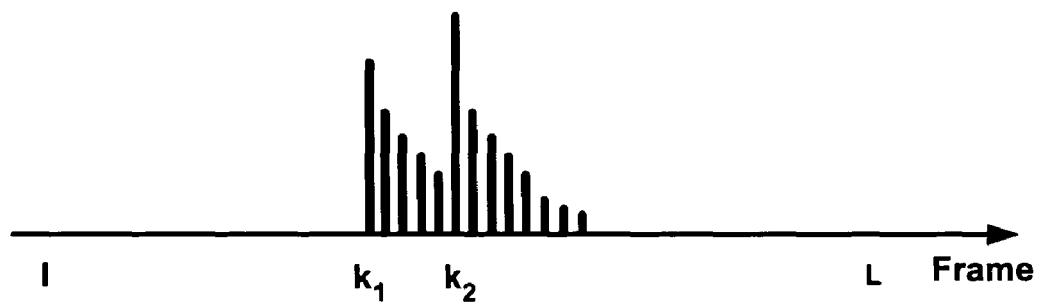
FIG. 9 is a graph showing distortion resulting from the loss of two frames according to one embodiment of the present invention.

FIG. 9 is a graph showing distortion in MSE resulting from the loss of two frames $k_1$ and $k_2$ according to one embodiment of the present invention. If $D(k_1, k_2)$ was stored for every possible pair $\{k_1, k_2\}$, then the total storage cost would be quadratic in L. However, since the distortion coupling between dropped packets decreases as the distance between the packets increases, one practical simplification is to assume $D(k_1, k_2)=D(k_1)+D(k_2)$ for $|k_1-k_2|>M$, where M depends on the compression. For example, for a 15-frame GOP, M is at most the number of packets in the GOP. This approximation reduces the required storage and computation for distortion information from $L^2$ to L×M.

The distortion for an arbitrary loss pattern can be estimated using a number of approaches. For example, the distortion can be estimated using a first-order distortion chain, $DC^1$, where the distortion for a lost packet now depends on the last lost packet (memory of one). Specifically, for $k_1<k_2<\ldots<k_N$, $$\tilde{D}(K) = D(k_1, k_2) + \sum_{i=2}^{N-1} \{D(k_i, k_{i+1}) - D(k_i)\}. \quad (3)$$

Searching for a packet schedule using the above distortion estimate can be expensive computationally due to the interdependencies between lost packets. This complexity can be reduced through a number of approaches. For example, an iterative descent algorithm can be employed, in which the objective function $\overline{D}(K)$ is minimized one variable at a time while the other variables are kept constant, until convergence. In particular, consider first the case when R* is expressed in number of packets and assume that R*=m. Then, at iteration n, for n=1, 2, . . . , the individual entries of a drop pattern $K=(k_1, \ldots, k_m)$ is computed using $$k_j^{(n)} = \underset{k_j \in W_j^{(n)}}{\operatorname{argmin}} \tilde{D}(K), \quad (4)$$

for j=1, . . . , m, where the sets $W_j^{(n)}=\{k_{j-1}^{(n-1)}1, \ldots, k_{j+1}^{(n-1)}-1\}$. In other words, starting with a reasonable initial solution for K, at each iteration the subset of selected packets K is perturbed in order to find a subset that produces reduced distortion. At each iteration a subset with less or equal distortion is found, and therefore the algorithm is guaranteed to converge, though not necessarily to a global optimum. The case when R* is measured in bits can be solved using a similar gradient descent algorithm as above.

The above discussion identified a number of methods for predicting the total distortion that would result from losing an arbitrary set of packets, which range from tables which explicitly contain the distortion for different packet loss patterns, to potentially smaller tables and associated algorithms for predicting the distortion for different packet loss patterns. In addition, other approaches for predicting the distortion can also be incorporated in module 625 of FIG. 6.

In summary, in its various embodiments, the present invention provides methods and systems for streaming media based on the use of scheduling cues. During encoding, in one embodiment, rate-distortion information is generated and included in scheduling cues. In such an embodiment, the rate-distortion information is unencrypted (although it can be encrypted) while the media data itself is encrypted.

The scheduling cues can be used by a streaming server to prioritize data packets. The streaming server can use the scheduling cues to determine a packet transmission schedule that may maximize quality (e.g., reduce distortion) at a receiver, also considering information such as network performance and delivery deadlines. Using the scheduling cues, the streaming server does not need to decrypt the media data, and also does not have to analyze the media data in real time. Without significantly increasing complexity or computational effort, embodiments in accordance with the present invention result in a performance gain comparable to performance gains realized with much more complex techniques. According to the present invention, with the bit rate reduced below the original encoded bit rate in order to meet available bandwidth constraints, quality is significantly higher relative to conventional systems.

Embodiments of the present invention are thus described. While the present invention has been described in particular embodiments, it should be appreciated that the present invention should not be construed as limited by such embodiments, but rather construed according to the following claims.

What is claimed is:

1. A method of streaming data, said method comprising:
receiving media data comprising a plurality of data packets from a storage element, wherein said media data comprises encrypted data;
receiving a plurality of scheduling cues that quantify characteristics of individual data packets in said plurality of data packets from said storage element, wherein each scheduling cue of said plurality of scheduling cues is uniquely associated with a particular data packet of said plurality of data packets; and
using said plurality scheduling cues to determine a distortion reducing order for sending said plurality of data packets in a network that reduces distortion at a receiver, wherein said order is determined without decrypting said encrypted data and without requiring analysis of said data packets in real time.

2. The method of claim 1 further comprising:
determining that a particular data packet did not arrive at a node of said network; and
using a scheduling cue associated with said particular data packet to determine whether to resend said particular data packet.

3. The method of claim 1 further comprising:
using said plurality scheduling cues to determine whether or not to send a particular data packet.

4. The method of claim 1 wherein said plurality scheduling cues comprises information selected from the group consisting of:
information identifying the beginning and end of said data packet's data; header information for said data packet; information identifying the length of said data packet; information identifying a transmission time of said data packet; information identifying nominal presentation time for said data packet; information quantifying for said data packet an amount of distortion predicted to occur should said data packet not be sent or received; coding dependencies between said data packets; information identifying for said data packet how many data packets are dependent on said data packet; information identifying which of said data packets provide error resiliency; information identifying which of said data packets provide redundancy; and information identifying a deadline for delivering said data packet.

5. The method of claim 1 further comprising:
accessing second information that characterizes network performance; and
using said second information with said plurality scheduling cues to determine said order for sending said data packets.

6. The method of claim 5 wherein said second information comprises information selected from the group consisting of: bandwidth available along a path in said network; bottleneck link capacity along said path; data packet delivery rate; data packet loss rate; data packet received pattern; data packet loss pattern; information identifying which of said data packets were received at a node along said path; information identifying which of said data packets did not arrive at a node along said path; information quantifying time needed to traverse said path; and information quantifying delays associated with said path.

7. The method of claim 1 wherein said data packets constitute data that are predictively encoded.

8. The method of claim 1 wherein said data packets constitute data that are scalably encoded.

9. The method of claim 1 wherein said data and said scheduling cue are stored in a single file.

10. The method of claim 1 wherein said plurality scheduling cues are encrypted.

11. The method of claim 10 wherein said media data are encrypted using a first encryption algorithm and said plurality scheduling cues are encrypted using a second encryption algorithm that is different from said first encryption algorithm.

12. The method of claim 1 wherein said order is determined without knowledge of the content of said data packets.

13. A method of scheduling the transmission of data packets comprising data, said method comprising:
generating a distortion monitoring transmission schedule for sending a plurality of data packets over a network, wherein said distortion monitoring transmission schedule maintains distortion at or below a specified threshold, wherein said data packets comprise encrypted data and wherein said distortion monitoring transmission schedule is generated without decrypting said encrypted data and without requiring analysis of said data packets in real time;
receiving a scheduling cue from a storage element that quantifies for a data packet an effect that would result if said data packet was not sent or received;

evaluating said distortion monitoring transmission schedule using said scheduling cue to measure an effect associated with said distortion monitoring transmission schedule; and determining whether to transmit any of said data packets using said distortion monitoring transmission schedule considering said measure of said effect.

14. The method of claim 13 wherein said measure of said effect comprises an amount of distortion associated with a display of said data, wherein said scheduling cue comprises for said data packet an amount of distortion that would result if said data packet was not sent or received.

15. The method of claim 14 wherein said evaluating comprises:
determining said total distortion assuming loss of a single data packet from said plurality of data packets.

16. The method of claim 14 wherein said evaluating comprises:
determining said total distortion assuming loss of more than one data packet, said total distortion determined assuming loss of data packets in different numbers and combinations.

17. The method of claim 13 wherein said plurality of data packets comprises any data packets not yet transmitted, any data packets transmitted but known to be lost during transmission, and any data packets transmitted but whose status is unknown.

18. The method of claim 13 further comprising:
transmitting some portion of said plurality of said data packets according to said distortion monitoring transmission schedule.

19. The method of claim 13 further comprising:
repeating said generating, accessing, evaluating and selecting steps periodically to determine a newer schedule for transmitting said plurality of data packets.

20. The method of claim 13 said scheduling cue comprises information selected from the group consisting of: information identifying the beginning and end of said data packet's data; header information for said data packet; information identifying the length of said data packet; information identifying a transmission time of said data packet; information identifying nominal presentation time for said data packet; information quantifying for said data packet an amount of distortion predicted to occur should said data packet not be sent or received; coding dependencies between said data packets; information identifying for said data packet how many data packets are dependent on said data packet; information identifying which of said data packets provide error resiliency; information identifying which of said data packets provide redundancy; and information identifying a deadline for delivering said data packet.

21. The method of claim 13 further comprising evaluating said distortion monitoring transmission schedule also using second information that characterizes network performance.

22. The method of claim 21 wherein said second information is selected from the group consisting of: bandwidth available along a path in said network; bottleneck link capacity along said path; data packet delivery rate; data packet loss rate; data packet received pattern; data packet loss pattern; information identifying which of said data packets were received at a node along said path; information identifying which of said data packets did not arrive at a node along said path; information quantifying time needed to traverse said path; and information quantifying delays associated with said path.

23. The method of claim 13 wherein said data packets constitute data that are predictively encoded.

24. The method of claim 13 wherein said data packets are scalably encoded.

25. The method of claim 13 wherein said data and said scheduling cue are stored in a single file.

26. The method of claim 13 wherein said scheduling cue is encrypted.

27. The method of claim 13 wherein said distortion monitoring transmission schedule is selected without knowledge of the content of said data packets.

28. The method of claim 13 further comprising:
generating a plurality of distortion monitoring transmission schedules that list different orders for sending said plurality of data packets over said network;
evaluating said distortion monitoring transmission schedules using said scheduling cue to measure said effect for each distortion monitoring transmission schedule evaluated; and
selecting one of said distortion monitoring transmission schedules considering said measure, wherein said one of said distortion monitoring transmission schedules are selected without decrypting said encrypted data.

29. A system for streaming data in a network, said system comprising:
a streaming element for streaming a plurality of data packets over said network according to a distortion reducing that reduces distortion at a receiver, said distortion reducing order is determined using a plurality of scheduling cues that quantify characteristics of individual data packets in said plurality of data packets, said data packets comprising encrypted data, wherein said plurality of data packets and said plurality of scheduling cues are received from a storage element, wherein each scheduling cue of said plurality of scheduling cues is uniquely associated with a particular data packet of said plurality of data packets, and wherein said distortion reducing order is determined and said data packets are streamed without decrypting said encrypted data and without requiring analysis of said data packets in real time.

30. The system of claim 29 wherein said streaming element is also for determining said distortion reducing order for streaming said data packets.

31. The system of claim 29 wherein said streaming element receives said distortion reducing order for streaming said data packets from another node of said network.

32. The system of claim 29 further comprising:
a storage element coupled to said streaming element, said storage element for storing said data and for storing said plurality of scheduling cues;
an encoder element coupled to said storage element, said encoder element for encoding said data and for generating said plurality of scheduling cues; and
an encrypter element coupled to said storage element, said encrypter element for encrypting said data.

33. The system of claim 29 further comprising:
a storage element coupled to said streaming element, said storage element for storing said data and for storing said plurality of scheduling cues;
an encoder element coupled to said storage element, said encoder element for encoding said data;
an encrypter element coupled to said storage element, said encrypter element for encrypting said data; and
a cue generator element coupled to said storage element, said cue generator element for generating said plurality of scheduling cues.

34. The system of claim 29 adapted to receive an indication that a particular data packet did not arrive at a node of said network, wherein said streaming element determines whether to resend said particular data packet.

35. The system of claim 29 wherein said streaming element is also for determining whether or not to send a particular data packet according to said distortion reducing order.

36. The system of claim 29 wherein said plurality of scheduling cues comprises information selected from the group consisting of: information identifying the beginning and end of said data packet's data; header information for said data packet; information identifying the length of said data packet; information identifying a transmission time of said data packet; information identifying nominal presentation time for said data packet; information quantifying for said data packet an amount of distortion predicted to occur should said data packet not be sent or received; coding dependencies between said data packets; information identifying for said data packet how many data packets are dependent on said data packet; information identifying which of said data packets provide error resiliency; information identifying which of said data packets provide redundancy; and information identifying a deadline for delivering said data packet.

37. The system of claim 29 wherein said distortion reducing order for sending said data packets is also determined using second information that characterizes network performance, wherein said second information is selected from the group consisting of: bandwidth available along a path in said network; bottleneck link capacity along said path; data packet delivery rate; data packet loss rate; data packet received pattern; data packet loss pattern; information identifying which of said data packets were received at a node along said path; information identifying which of said data packets did not arrive at a node along said path; information quantifying time needed to traverse said path; and information quantifying delays associated with said path.

38. The system of claim 29 wherein a scheduling cue of said plurality of scheduling cues describes for said data packet an amount of distortion that would result if said data packet was not sent or received, wherein said streaming element generates transmission schedules that list different distortion reducing orders for sending said plurality of data packets over said path, evaluates said transmission schedules using second information that characterizes network performance along said path to determine a total distortion associated with transmission schedules that are evaluated, and selects a transmission schedule that substantially minimizes said total distortion.

39. The system of claim 29 wherein said plurality of data packets comprises any data packets not yet transmitted, any data packets transmitted but known to be lost during transmission, and any data packets transmitted but whose status is unknown.

40. The system of claim 29 wherein said streaming element also uses said plurality of scheduling cues to determine whether to allocate forward error correction information (FEC) among said data packets and how to allocate said FEC information among said data packets.

41. The system of claim 29 wherein said streaming element also uses said scheduling cue to determine whether to switch to streaming another plurality of data packets constituting said data, said switch made according to network performance characteristics.

42. The system of claim 29 wherein said plurality of scheduling cues are encrypted.

43. The system of claim 29 wherein said distortion reducing order is determined without knowledge of the content of said data packets.

44. A method of streaming data, said method comprising:
receiving media data comprising a plurality of data packets from a storage element;
receiving a plurality of scheduling cues that quantify characteristics of individual data packets in said plurality of data packets from said storage element, wherein each scheduling cue of said plurality of scheduling cues is uniquely associated with a particular data packet of said plurality of data packets, wherein said scheduling cue is encrypted; and
using said plurality scheduling cues to determine distortion reducing order for sending said plurality of data packets in a network that reducing distortion at a receiver, wherein said distortion reducing order is determined without decrypting said encrypted data and without requiring analysis of said data packets in real time.

45. The method of claim 44 wherein said plurality of scheduling cues comprises information selected from the group consisting of:
information identifying the beginning and end of said data packet's data; header information for said data packet; information identifying the length of said data packet; information identifying a transmission time of said data packet; information identifying nominal presentation time for said data packet; information quantifying for said data packet an amount of distortion predicted to occur should said data packet not be sent or received; coding dependencies between said data packets; information identifying for said data packet how many data packets are dependent on said data packet; information identifying which of said data packets provide error resiliency; information identifying which of said data packets provide redundancy; and information identifying a deadline for delivering said data packet.

* * * * *

UNITED STATES PATENT AND TRADEMARK OFFICE
CERTIFICATE OF CORRECTION

| | | |
|---|---|---|
| PATENT NO. | : 7,966,488 B2 | Page 1 of 1 |
| APPLICATION NO. | : 10/970620 | |
| DATED | : June 21, 2011 | |
| INVENTOR(S) | : John G. Apostolopoulos | |

It is certified that error appears in the above-identified patent and that said Letters Patent is hereby corrected as shown below:

In column 1, line 11, delete "10/1769,327," and insert -- 10/769,327, --, therefor.

Signed and Sealed this
Twenty-second Day of May, 2012

David J. Kappos
*Director of the United States Patent and Trademark Office*